United States Patent [19]

Bunn

[11] Patent Number: 4,911,369

[45] Date of Patent: Mar. 27, 1990

[54] BREWING FUNNEL SUPPORT FOR A COFFEE GRINDER

[75] Inventor: Arthur H. Bunn, Springfield, Ill.

[73] Assignee: Bunn-O-Matic Corporation, Springfield, Ill.

[21] Appl. No.: 309,474

[22] Filed: Feb. 13, 1989

[51] Int. Cl.⁴ .............................................. B02C 19/12
[52] U.S. Cl. ..................................................... 241/100
[58] Field of Search .......................... 99/286, 304, 306; 248/310, 316.2, 316.3; 241/33, 34, 36, 100, 259

[56] References Cited

U.S. PATENT DOCUMENTS

| 786,151 | 3/1905 | Ribert | 241/100 |
| 2,077,980 | 4/1937 | Bell | 241/100 X |
| 4,607,200 | 8/1986 | Zimmerman | 241/33 X |

Primary Examiner—Mark Rosenbaum
Attorney, Agent, or Firm—Richard Bushnell

[57] ABSTRACT

A coffee grinder for discharging ground coffee into a brewing funnel which will be removed and inserted into a coffee making machine. The coffee grinder has a ground coffee discharge opening in the underside of an overhanging portion of the grinder. A U-shaped spring is mounted on a platform spaced below the overhanging portion. The lower leg of the spring is mounted on the platform and the bight of the spring faces in the direction in which brewing funnels are inserted on the grinder. The upper depressible leg of the spring upwardly presses and holds an inserted brewing funnel against the underside of the overhanging portion in position to receive ground coffee. Preferably, the upper leg has a funnel-guiding slot therein.

4 Claims, 2 Drawing Sheets

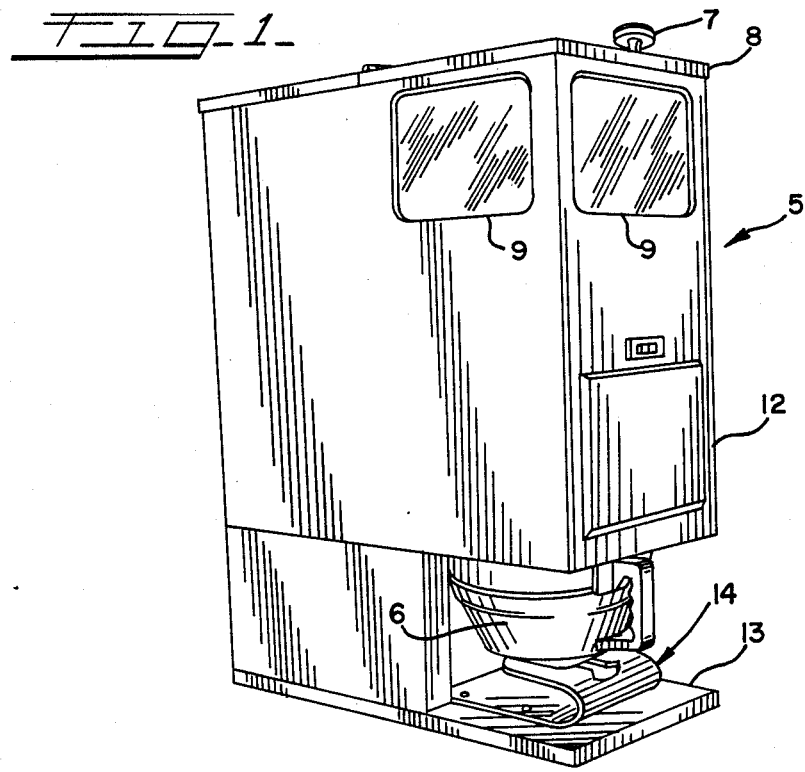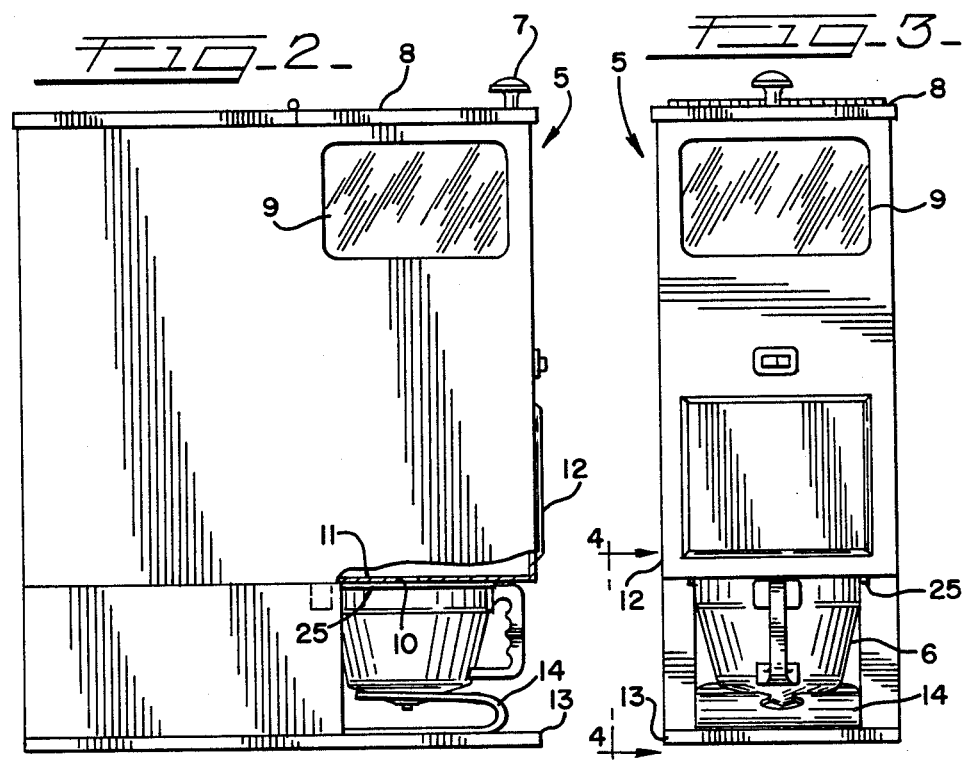

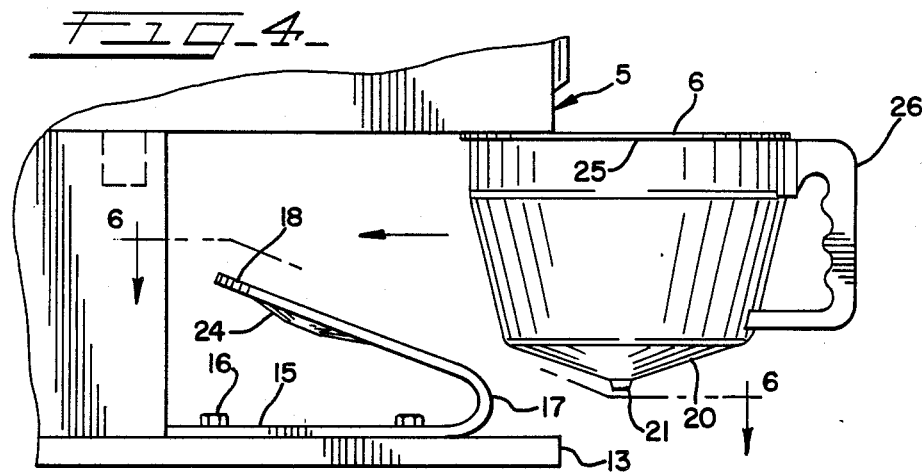
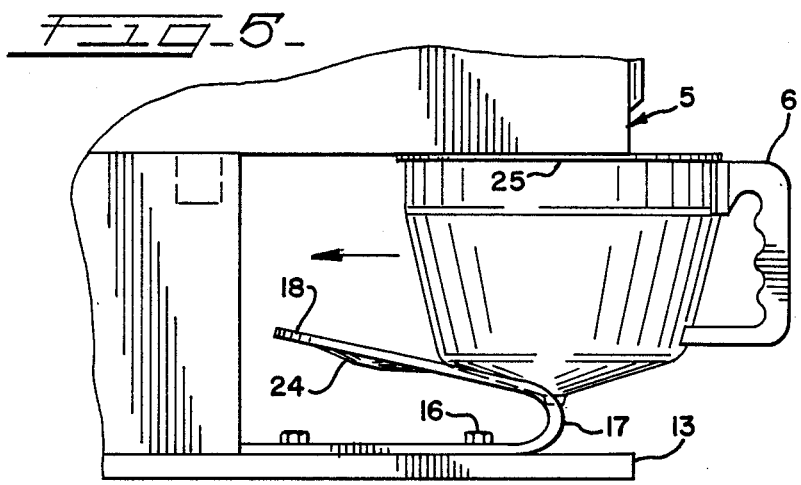
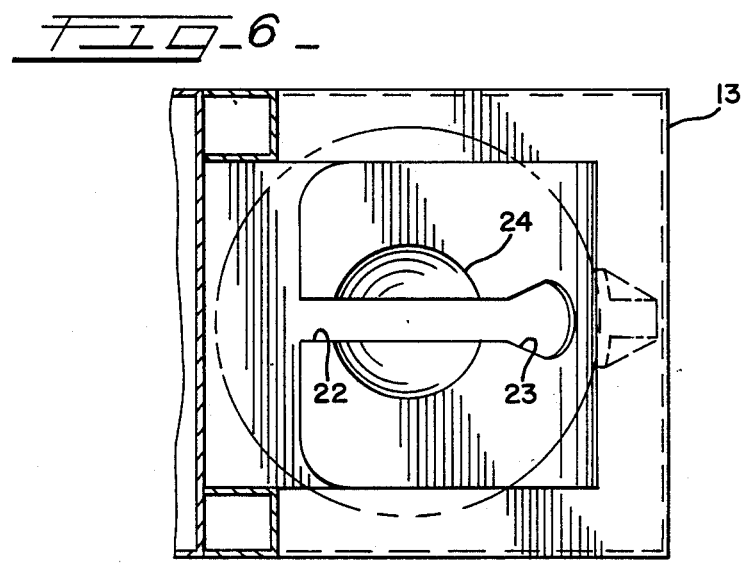

BREWING FUNNEL SUPPORT FOR A COFFEE GRINDER

This invention relates generally to means for releasably supporting a brewing funnel of a coffee making machine on a coffee grinder in such position thereon as to have ground coffee for brewing a batch of coffee discharged into the brewing funnel. Coffee making machines of the type wherein a disposable filter is inserted into a brewing funnel, ground is loaded into the brewing funnel on the filter, and the brewing funnel is inserted into the coffee making machine wherein hot water is sprayed over the coffee in the funnel and the brewed coffee is collected in a container under the funnel, are well known and in widespread use. In recent years, the practice of making coffee with freshly ground coffee beans has become popular and coffee grinders are available which are adapted to grind coffee beans into batches of ground coffee of the sizes suitable for the brewing funnels of coffee machines used in restaurants, offices, homes, etc.

Instead of collecting a batch of ground coffee in a separate container and then transferring it from that container into a filter-lined brewing funnel, it is desirable for convenience and other reasons to collect the batch of ground coffee directly into the brewing funnel onto the filter placed therein. As a practical matter because of the various sizes and shapes of the brewing funnels that are in use and the variations in the configurations and the thicknesses of the supporting flanges customarily located at the rims of the funnels, there has been a problem in releasably supporting the brewing funnels in a coffee grinder so as to receive a ground batch of coffee therein.

The object of the present invention, generally stated, is the provision of brewing funnel support means for a coffee grinder which will permit brewing funnels of widely different sizes, dimensions, shapes and with rim supporting flanges of different thickness and shapes to be mounted on a coffee grinder so as to releasably support such brewing funnels under a ground coffee discharge opening.

An important object of the invention is the provision of brewing funnel support means for a coffee grinder comprising spring means for combination with a coffee grinder having a downwardly discharging ground coffee outlet in a horizontal underside surface of raised portion of the grinder overhanging a platform portion, the spring means serving to releasably support one at a time on the grinder brewing funnels which are of substantially different size and shape in position to receive ground coffee discharging from the outlet opening, the spring means being mounted on the platform portion of the grinder and having a depressible funnel bottom-engaging portion which on placement of a brewing funnel in position to receive ground coffee upwardly depresses and retains the funnel against the underside surface.

A further important object of the invention is the provision of brewing funnel support means for a coffee grinder of the foregoing type with the spring means being generally U-shaped and having its lower leg mounted on a platform portion of the grinder and with the upper leg being depressible and serving to upwardly press and hold an inserted brewing funnel in position against an overhanging portion of the grinder having a ground coffee discharge opening and with the bight of the U-shaped spring being exposed either toward the front of the grinder or to the one of the sides of the grinder.

Still another important object of the invention is the provision of brewing funnel support means for a coffee grinder in the form of a U-shaped spring with the upper leg of the spring being depressible and having a slot opening therein for receiving and guiding the bottommost part of a brewing funnel as it is inserted on a grinder to receive ground coffee.

Certain other objects of the invention will appear hereinafter in connection with the following detailed description of preferred embodiments of the invention taken in connection with the accompanying drawings wherein:

FIG. 1 is a perspective view of a coffee grinder with a brewing funnel supported in place thereon by spring means and forming one embodiment of the present invention;

FIG. 2 is a left side elevational view of the coffee grinder shown in FIG. 1;

FIG. 3 is a front elevational view of the coffee grinder shown in FIG. 1;

FIG. 4 is a fragmentary elevational view on enlarged scale taken on line 4—4 of FIG. 3 and showing the brewing funnel at the initial stage of its insertion onto the grinder;

FIG. 5 is a view similar to FIG. 4 and showing the brewing funnel in a more advanced insertion position; and FIG. 6 is a fragmentary view taken on line 6—6 of FIG. 4.

In FIGS. 1-3, a coffee bean grinder is indicated generally at 5 having inserted in place therein a brewing funnel indicated generally at 6. The coffee grinder 5 may be of well known commercial type and the details of construction thereof do not form a part of the present invention. For example, the coffee grinder 5 may have construction of the grinder shown and described in U.S. Pat. No. 4,749,134, dated June 7, 1988, to Raymond E. Van Camp, assigned to the assignee of the present invention and application. Likewise, the brewing funnel 6 may be of known commercial type such as used in known commercial coffee brewers. For example, the brewing funnel 6 may be of the construction of the brewing funnel shown in U.S. Pat. No. 3,374,897 issued Mar. 26, 1968 to John C. Martin, and assigned to the assignee of the present invention and application. The disclosures of U.S. Pat. Nos. 4,749,134 and 3,374,897 are incorporated by reference herein.

The grinder 5 can be loaded with coffee beans from the top by lifting on the handle 7 on the door 8 opening into the bean hopper which is provided with windows 9—9 through which the quantity of beans remaining to be ground may be viewed. The grinder mechanism disposed within the body of the grinder 5 discharges ground coffee through an opening 10 (FIG. 2) in the plate 11 forming the underside of the portion 12 of the grinder 5 that overhangs platform 13.

It will be noted from FIGS. 1-3 that the brewing funnel 6 is supported underneath the overhanging portion 12 by a U-shaped spring 14 mounted on the platform 13, the construction and operation of the spring 14 is further shown and illustrated in FIGS. 4-6.

The bottom leg 15 of the U-shaped biasing means or spring 14 is attached to the platform 13 by screws 16—16. The spring 14 is oriented so that the bight 17 thereof faces toward the front of the grinder 5. However, it will be appreciated that the orientation could also be either to the left or the right if there is a need or desire to insert and remove the funnel from one of the sides instead of from the front. The upper leg 18 of the spring 14 is upwardly inclined in the direction of the grinder 5 so that upon insertion of the funnel 6 depression of the upper leg 18 in a counterclockwise direction (as viewed in FIGS. 4 and 5) will be required.

The yieldability of the upper leg 18 is such that a wide range of sizes of funnels 6 can be accommodated both with respect to the vertical dimensions of the funnels and also with respect to the diameter or horizontal dimensions.

Generally brewing funnels, such as brewing funnel 6 will have a conical bottom 20 with an outlet nipple 21 in the center. Advantage may be taken of the conical bottom 20 and nipple 21 by providing the upper leg 18 with a funnel guide slot 22 (FIG. 6) having an enlarged inlet end 23. In addition, the upper leg 18 is provided with a circular depressed portion 24 which further assists in the proper orientation of the funnel 6 on the spring 14.

When a funnel 6 is fully inserted into ground coffee receiving position as shown in FIGS. 1-3 and 6, the upper rim or flange 25 on the funnel 6 will engage the underside of the plate 11 and the funnel will be upwardly pressed and held in position on the grinder 5.

It will be seen that an operator can readily insert a funnel 6 into position on the grinder 5 and withdraw the same by use of the handle 26 on the funnel.

It will be apparent to those skilled in the art that certain change may be made in the spring 14 while retaining its general function of receiving and retaining brewing funnels in position on a grinder. For example, the spring 14 can be divided longitudinally into two halves which are spaced apart so as to provide the equivalent of the guiding slot 22. Further, the U-shaped spring 14 can be replaced by a spring in the form of a platform corresponding to upper leg 14 which is supported from its four corners by compression springs mounted on the platform 13. These and certain other changes in design can be made by those skilled in the art without departing from the spirit and scope of the invention as defined in the accompanying claims.

What is claimed is:

1. In combination with a coffee grinder having a downwardly discharging ground coffee outlet in an underside surface of a raised portion of said grinder overhanging a platform portion and a coffee brewing funnel having a relatively large top opening and a relatively small protuberant outlet nipple, means for releasably supporting one at a time on said grinder said brewing funnels which are non-uniform in respect to size and shape in position to receive ground coffee discharging from said outlet comprising biasing means mounted on said platform and having a depressable funnel bottom-engaging portion formed at an inclined relative said platform portion and having a slot opening formed therein permitting side insertion of said coffee brewing funnel with said slot opening receiving said outlet nipple and which upon placement of a brewing funnel in said position to receive ground coffee upwardly presses and retains said funnel against said underside surface.

2. The combination of claim 1, wherein said spring means is generally U-shaped with one leg mounted on said platform portion, with the bight exposed and with the upper remaining leg providing said depressible funnel bottom-engaging portion.

3. The combination of claim 2, wherein said upper remaining leg has a slot therein for receiving the bottom-most portion of a brewing funnel and guiding the funnel into its said ground coffee receiving position.

4. In combination with a coffee grinder having a downwardly discharging ground coffee outlet in an underside surface of a raised portion of said grinder overhanging a platform portion means for releasably supporting one at a time on said grinder brewing funnels which are non-uniform in respect to size and shape in position to receive ground coffee discharging from said outlet comprising a U-shaped leaf spring having one leg mounted on said platform and having a depressable funnel bottom-engaging portion permitting side insertion of said coffee brewing funnel and for upwardly pressing and retaining said funnel against said underside surface, and slot means in said depressable funnel bottom-engaging portion positioned for receiving a downwardly projecting outlet nipple formed on a coffee brewing funnel.

* * * * *